US006816359B1

(12) United States Patent
Hsiao

(10) Patent No.: US 6,816,359 B1
(45) Date of Patent: Nov. 9, 2004

(54) POWER SUPPLY CASING

(76) Inventor: Feng-Shen Hsiao, 10th Fl., No. 5, Sec. 1, Tun Hua S. Rd., Taipei (TW)

( * ) Notice: Subject to any disclaimer, the term of this patent is extended or adjusted under 35 U.S.C. 154(b) by 0 days.

(21) Appl. No.: 10/631,943

(22) Filed: Jul. 31, 2003

(51) Int. Cl.[7] .................................................. H02B 1/00

(52) U.S. Cl. ....................... 361/601; 361/622; 361/641; 361/643; 174/66; 174/67; 174/135; 200/51.03; 200/51 R; 439/76.1; 439/535; 439/652

(58) Field of Search ................................ 361/601, 622, 361/641–643; 174/66, 67, 135; 200/51.03, 51 R; 439/535, 652, 76.1

(56) References Cited

U.S. PATENT DOCUMENTS 5,984,728 A * 11/1999 Chen et al. ................. 439/620
6,135,820 A * 10/2000 Chiang ....................... 439/654
6,297,450 B1 * 10/2001 Yu ............................. 174/66
6,329,616 B1 * 12/2001 Lee ......................... 200/51.03
6,454,609 B1 * 9/2002 Huang ........................ 439/652
6,697,246 B2 * 2/2004 Huang ........................ 361/103
6,750,410 B2 * 6/2004 Lee ......................... 200/51.03

* cited by examiner

*Primary Examiner*—Boris Chervinsky
(74) *Attorney, Agent, or Firm*—Alan D. Kamrath; Nikolai & Mersereau, P.A.

(57) ABSTRACT

A power supply casing includes a top casing having a recessed area defined in a mediate portion of the top casing and multiple cutouts defined in a slanted front portion of the top casing. A bottom casing has multiple sets of conducting plates formed on a rear portion of the bottom casing to correspond to multiple sockets in the top casing. Switches are electrically connected to the multiple sets of conducting plates and buttons are respectively arranged in the cutouts of the top casing. Each button corresponds to one of the switches such that each button is able to control initiation of one switch, which activates power supply from one specific socket to a specific computer peripheral device and a total space occupied by the power supply casing is small.

2 Claims, 4 Drawing Sheets

POWER SUPPLY CASING

BACKGROUND OF THE INVENTION

1. Field of the Invention

The present invention relates to a power supply, and more particularly to a supply casing having multiple sockets securely mounted on a rear portion of the casing, a recessed area defined in a mediate portion of the casing and a slanted area formed on a front portion of the casing such that the power supply casing is slim and has a streamlined appearance.

2. Description of Related Art

With reference to FIG. 4, a conventional power supply casing (5) is shown to have a uniform thickness, wherein multiple sockets (51) are provided on a rear portion of the casing and multiple buttons (53) are formed on a front portion of the power supply casing (5). The quantity of the buttons (53) corresponds to the quantity of the sockets (51) so that each button (53) is able to control a specific function in a computer set due to a steady power supply from the plugs (51) after the extension cord (55) is electrically connected to an outlet. Furthermore, each of the buttons (53) is electrically connected to a corresponding one of switches (54) which are vertically standing inside the power supply casing (5). Due to the upwardly standing switches (54), the thickness of the power supply is thick.

It is noted that the power supply casing (5) has a uniform thickness such that the power supply casing (5) occupies a large space on a desk. That is, when the power supply casing (5) is placed on top of the desk and a display or a monitor is again placed on a top face of the power supply, the total volume of the power supply casing (5) in combination of the display is large.

To overcome the shortcomings, the present invention tends to provide an improved power supply casing to mitigate the aforementioned problems.

SUMMARY OF THE INVENTION

The primary objective of the present invention is to provide an improved power supply casing having a recessed area defined in a mediate portion of the casing and a slanted area formed on a front portion of the casing so that the power supply casing has a streamlined design and occupies only a little of the available space. Other objects, advantages and novel features of the invention will become more apparent from the following detailed description when taken in conjunction with the accompanying drawings.

DETAILED DESCRIPTION OF THE PREFERRED EMBODIMENT

Figure 1:
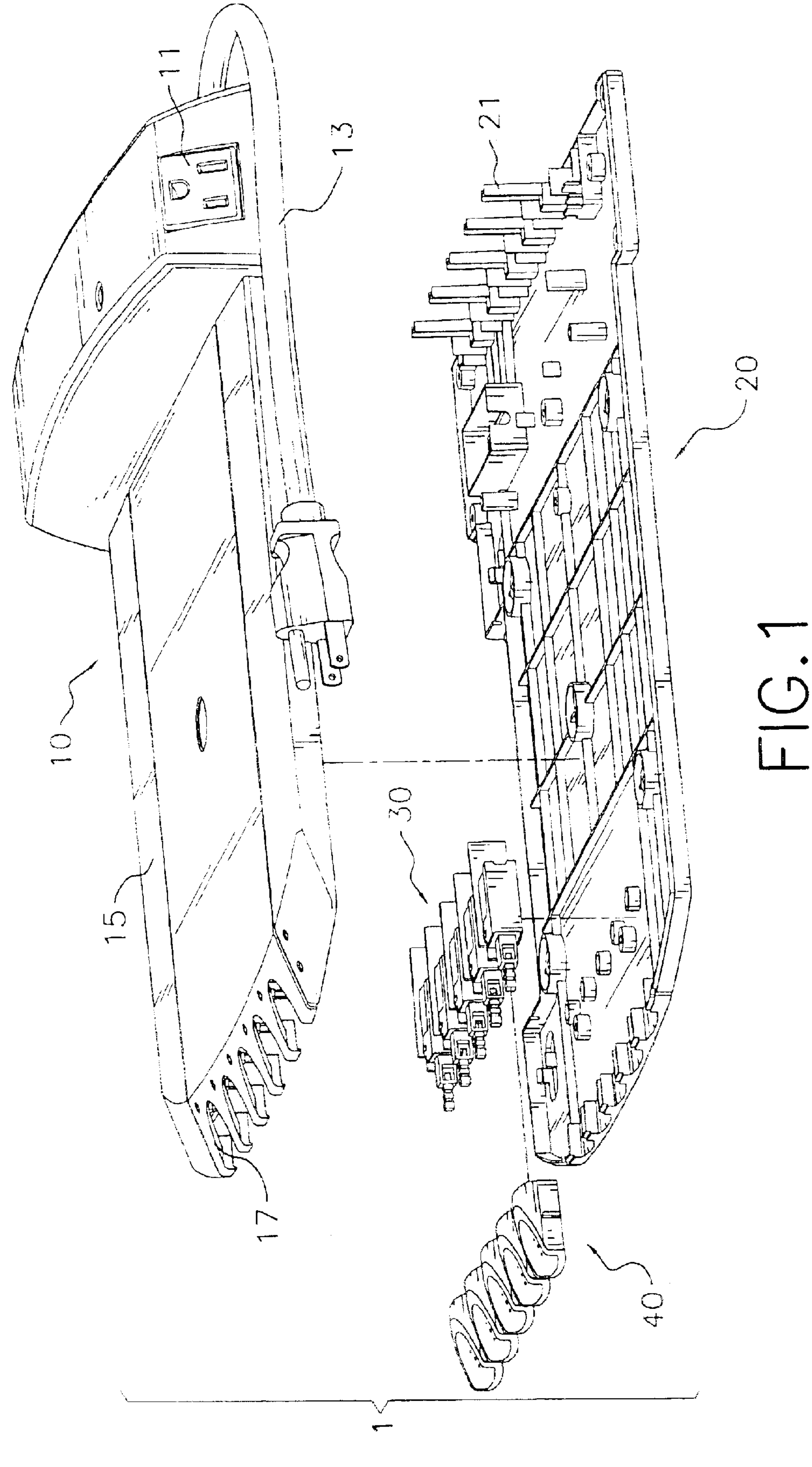
FIG. 1 is an exploded perspective view of the power supply casing of the present invention.

With reference to FIG. 1, the power supply casing (1) in accordance with the present invention includes a top casing (10), a bottom casing (20), multiple switches (30) and multiple buttons (40).

The top casing (10) has multiple sockets (11) (only one is disclosed on a side of the rear portion of the top casing (10)) formed on a rear portion of the top casing (10), an extension cord (13) extending out from the rear portion of the top casing (10), a recessed area (15) defined in a mediate portion of the top casing (10) and multiple cutouts (17) defined in a slanted front portion of the top casing (10).

The bottom casing (20) has multiple sets of conducting plates (21) formed on a rear portion of the bottom casing (20) to correspond to the multiple sockets (11) in the top casing (10).

The switches (30) are arranged in 90 degrees with respect to a normal position and electrically connected to the multiple sets of conducting plates (21). That is, the switches (30) are lying inside the bottom casing (20), which makes the entire size of the power supply casing a lot more compact when compared with the conventional one.

The buttons (40) are respectively arranged in the cutouts (17) of the top casing (10) and each button (40) corresponds to one of the switches (30). That is, each button (40) is able to control initiation of one switch (30), which activates power supply from a specific socket (11) to a specific computer peripheral device.

Figure 2:
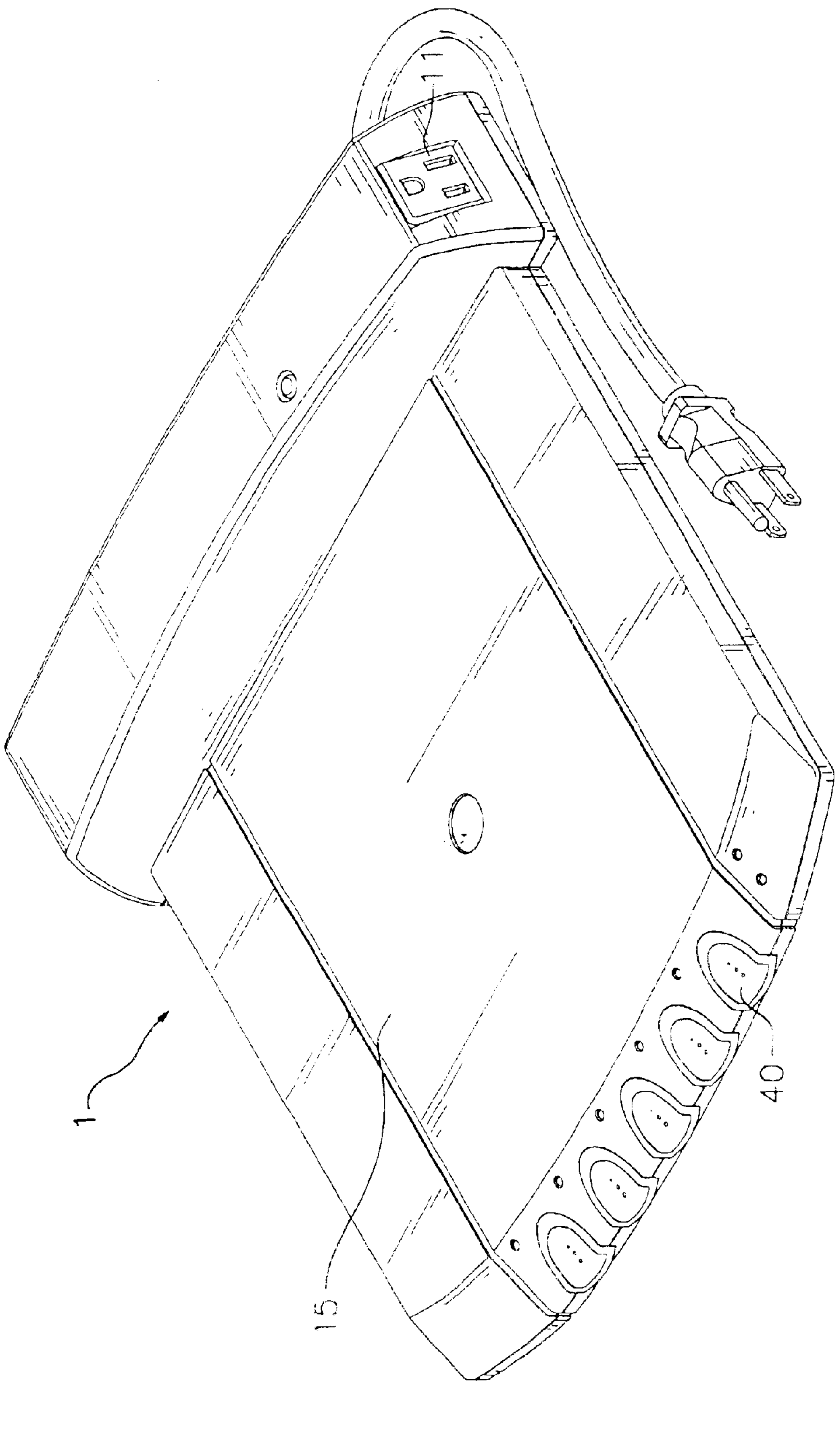
FIG. 2 is a perspective view of the power supply casing.

With reference to FIG. 2 and still using FIG. 1 for reference, when in assembly, the top casing (10) of the power supply casing (1) of the present invention is combined with the bottom casing (20) to have the sets of conducting plates (21) received in the corresponding sockets (11). After the electrical connection between the switches (30) and the multiple sets of conducting plates (21) is established, each button (40) is securely mounted in a corresponding one of the cutouts (17) to cover a corresponding one of the switches (30). Therefore, the button (40) is able to control a desired power supply to a specific computer peripheral device.

Figure 3:
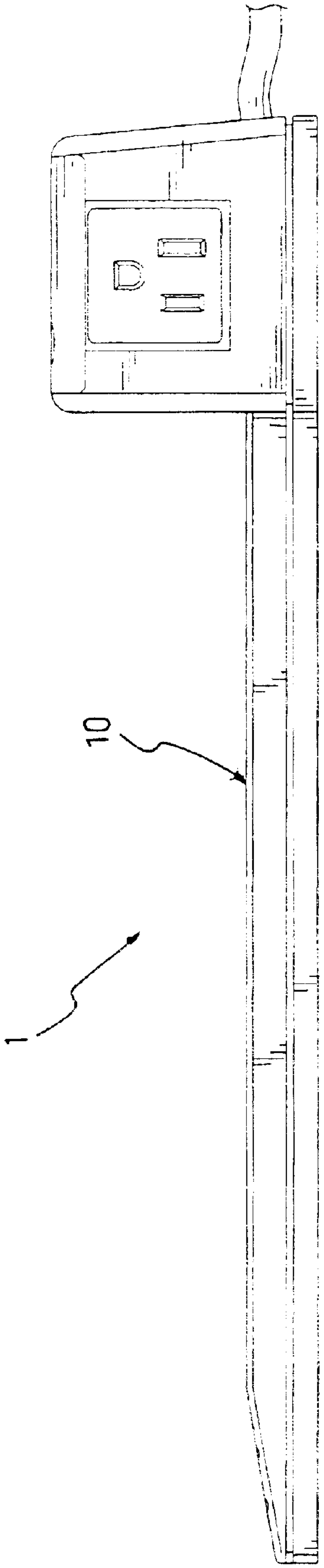
FIG. 3 is side view of the power supply casing in FIG. 2.
Figure 4:
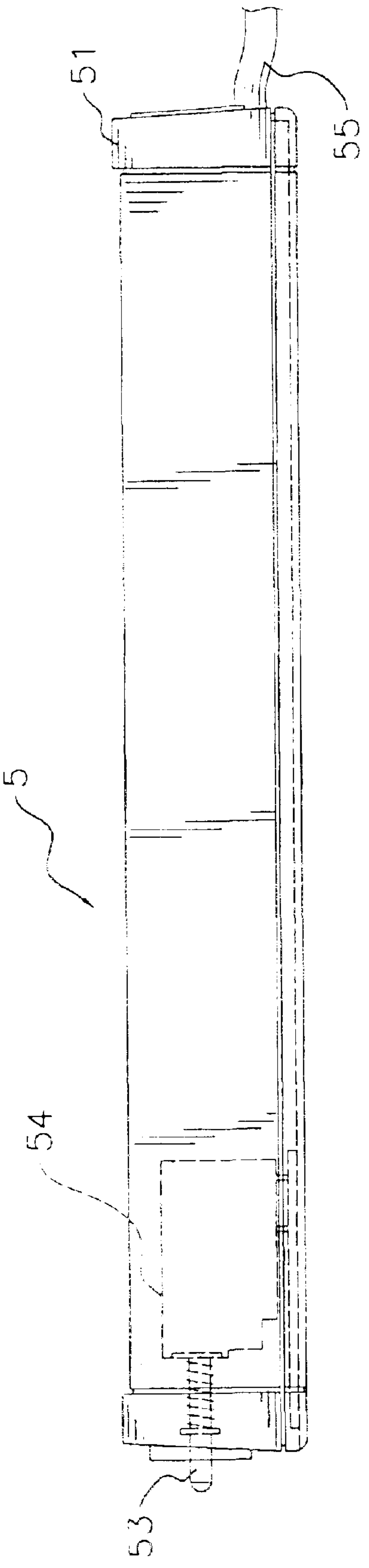
FIG. 4 PRIOR ART
FIG. 4 is a side view of a conventional power supply casing.

It is noted from FIG. 3 that the recessed portion (15) in the mediate portion and the slanted front portion in the front portion of the top casing (10) decreases the overall volume of the power supply casing (1) such that the total space occupied by the power supply casing (1) of the present invention is small.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A power supply casing comprising:

a top casing having multiple sockets formed on a rear portion of the top casing, an extension cord extending out from the rear portion of the top casing, a recessed area defined in a mediate portion of the top casing and multiple cutouts defined in a front portion of the top casing;

a bottom casing having multiple sets of conducting plates formed on a rear portion of the bottom casing to correspond to the multiple sockets in the top casing;

switches electrically connected to the multiple sets of conducting plates and laterally standing inside the bottom casing;

buttons respectively arranged in the cutouts of the top casing and each button corresponding to one of the switches such that each button is able to control initiation of a respective switch, which activates power supply from one specific socket to a specific computer peripheral device, whereby total space occupied by the power supply casing is small.

2. The power supply casing as claimed in claim 1, wherein the front portion of the top casing is slanted.

* * * * *